US008698601B2

(12) United States Patent
Sun et al.

(10) Patent No.: US 8,698,601 B2
(45) Date of Patent: Apr. 15, 2014

(54) METHOD FOR CARD-READING ANTI-COLLISION WITH AUTOMATIC FREQUENCY HOPPING

(75) Inventors: Yingtong Sun, Guangdong (CN); Jianhui Liu, Guangdong (CN)

(73) Assignee: Nationz Technologies, Inc., Shenzhen (CN)

( * ) Notice: Subject to any disclaimer, the term of this patent is extended or adjusted under 35 U.S.C. 154(b) by 201 days.

(21) Appl. No.: 13/102,816

(22) Filed: May 6, 2011

(65) Prior Publication Data

US 2011/0210828 A1    Sep. 1, 2011

Related U.S. Application Data

(63) Continuation of application No. PCT/CN2009/074462, filed on Oct. 15, 2009.

(30) Foreign Application Priority Data

Nov. 6, 2008   (CN) .......................... 2008 1 0217444

(51) Int. Cl.
*H04Q 5/22*   (2006.01)

(52) U.S. Cl.
USPC ..... 340/10.2; 340/10.1; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385

(58) Field of Classification Search
CPC ............ G06K 7/0008; G06K 19/0723; G06K 7/10039; G06Q 30/02; G06Q 10/087; G06Q 40/00; G06Q 20/1085; G06Q 20/341; G06Q 20/342; G07F 7/1008; G07F 17/145; G07F 19/20; G07C 1/14; G07C 1/10; G07B 15/04
USPC .................... 340/10.1–10.6, 572.1–572.9; 235/375–385
See application file for complete search history.

(56) References Cited

U.S. PATENT DOCUMENTS 6,726,099 B2 *   4/2004   Becker et al. ................. 235/380
(Continued)

FOREIGN PATENT DOCUMENTS

| CN | 1433555 | 7/2003 |
|----|---------|--------|
| CN | 101004786 | 7/2007 |

OTHER PUBLICATIONS

International Search Report mailed Jan. 28, 2010 for International application No. PCT/CN2009/074462, 4 pages.

(Continued)

*Primary Examiner* — George Bugg
*Assistant Examiner* — Paul Obiniyi
(74) *Attorney, Agent, or Firm* — Finnegan, Henderson, Farabow, Garrett & Dunner, LLP

(57) ABSTRACT

A method for card-reading anti-collision with automatic frequency hopping is provided, which is used for a system in which a card reader simultaneously reads a plurality of cards in radio frequency identification technologies. The method comprises: both the card reader and the cards to be read are configured to have an automatic frequency-sweep function and a function of hopping from a current channel to another channel, and to store access addresses and transaction addresses; when the card reader is in a frequency-hopping card-seeking state, it is in an n-channel frequency-hopping working state, in which, the access address of each channel is the same, and the card reader reads the cards by means of hopping frequencies in a sequence iteratively through n channels. When the card reader detects that two or more cards collide, the card reader sends a command of random frequency hopping, making all the conflicting cards to hop to other channels randomly and to wait to access those channels. The beneficial effects of said method includes: it can quickly realize a card-reading anti-collision mechanism and improve the card-reading speed.

6 Claims, 3 Drawing Sheets

(56) References Cited

U.S. PATENT DOCUMENTS

| | | | |
|---|---|---|---|
| 7,026,935 B2* | 4/2006 | Diorio et al. | 340/572.2 |
| 7,044,387 B2* | 5/2006 | Becker et al. | 235/492 |
| 7,156,312 B2* | 1/2007 | Becker et al. | 235/492 |
| 7,224,712 B2* | 5/2007 | Taki et al. | 375/132 |
| 7,283,037 B2* | 10/2007 | Diorio et al. | 340/10.51 |
| 7,304,579 B2* | 12/2007 | Diorio et al. | 340/572.4 |
| 7,401,740 B2* | 7/2008 | Becker et al. | 235/487 |
| 7,717,342 B2* | 5/2010 | Wang | 235/472.01 |
| 7,817,014 B2* | 10/2010 | Krishna et al. | 340/10.4 |
| 7,911,325 B2* | 3/2011 | Nagai et al. | 340/10.2 |
| 7,928,832 B2* | 4/2011 | Kung | 340/10.1 |
| 8,256,681 B2* | 9/2012 | Wang | 235/472.01 |
| 2004/0046016 A1* | 3/2004 | Becker et al. | 235/380 |
| 2004/0048579 A1* | 3/2004 | Becker et al. | 455/73 |
| 2004/0074976 A1* | 4/2004 | Becker et al. | 235/492 |
| 2004/0150510 A1* | 8/2004 | Taki et al. | 340/10.1 |
| 2004/0235428 A1* | 11/2004 | Nagai et al. | 455/85 |
| 2005/0099269 A1* | 5/2005 | Diorio et al. | 340/10.51 |
| 2005/0099270 A1* | 5/2005 | Diorio et al. | 340/10.51 |
| 2006/0108421 A1* | 5/2006 | Becker et al. | 235/451 |
| 2006/0145855 A1* | 7/2006 | Diorio et al. | 340/572.1 |
| 2006/0175408 A1* | 8/2006 | Becker et al. | 235/451 |
| 2006/0238303 A1* | 10/2006 | Loving | 340/10.1 |
| 2006/0238304 A1* | 10/2006 | Loving | 340/10.1 |
| 2006/0238305 A1* | 10/2006 | Loving et al. | 340/10.1 |
| 2006/0267733 A1* | 11/2006 | Steinke et al. | 340/10.1 |
| 2007/0041345 A1* | 2/2007 | Yarvis et al. | 370/331 |
| 2007/0045424 A1* | 3/2007 | Wang | 235/462.46 |
| 2007/0159302 A1* | 7/2007 | Park | 340/10.2 |
| 2008/0122581 A1* | 5/2008 | Bae et al. | 340/10.2 |
| 2010/0219250 A1* | 9/2010 | Wang | 235/462.43 |
| 2012/0331140 A1* | 12/2012 | Wang | 709/224 |

OTHER PUBLICATIONS

Chen, X et al., "Studies on Tag Anti-Collision Algorithms," 1994-2007 China Academic Journal Electronic Publishing House, pp. 13-15.

Written Opinion of the International Searching Authority mailed Jan. 28, 2010, issued in related International Application No. PCT/CN2009/074462 for Nationz Technologies, Inc., 3 pages.

* cited by examiner

METHOD FOR CARD-READING ANTI-COLLISION WITH AUTOMATIC FREQUENCY HOPPING

CROSS REFERENCE TO RELATED PATENTS

This application is a continuation of International Application No. PCT/CN2009/074462, filed Oct. 15, 2009, titled "Anti-Collision Method For Reading Cards By Using Automatic Frequency Hopping," which claims the priority and benefit to Chinese Patent Application No. 200810217444.5, filed Nov. 6, 2008, both of which are hereby incorporated by reference in their entireties.

FIELD OF THE INVENTION

This invention relates to a recording carrier used along with a machine, more particularly to a recording carrier having semiconductor circuit elements, and especially to a method for card-reading anti-collision with automatic frequency hopping.

BACKGROUND OF THE INVENTION

In radio frequency identification ("RFID") technologies, the situation that one card reader needs to read multiple cards simultaneously is often encountered. How to implement an anti-collision mechanism under such a multi-card collision is one of the problems to be resolved in RFID technologies.

Currently, the anti-collision mechanism adopted by most RFID technologies is as follows: compare the user identification codes (UIDs) of the cards from a low bit to a high bit, and record the bit position at which a collision (i.e., conflict) occurs among the UIDs of the multiple cards. Since the UID of each card is unique globally, it is possible to differentiate the cards with different UIDs and use the cards to perform different data transactions, after bit-by-bit comparison of the UIDs. When this mechanism is used, if the UIDs of two cards to be read are different at high bits but identical at low bits, and then it surely costs much more time, by using the bit-by-bit comparison method, to identify the bit position at which the UIDs of the two cards are different. Therefore, in actual applications, this card-reading method will certainly cause a whole transaction to become very slow due to the long card-reading time.

SUMMARY OF THE INVENTION

The technical problem to be resolved by this invention is to avoid the shortcoming of existing technologies. This invention provides a faster and simpler anti-collision mechanism with automatic frequency hopping, and thus avoids existing technologies' bit-by-bit comparison of the UID numbers of the cards to be read. Instead, an anti-collision mechanism is realized quickly in case of a collision by directly changing the channels of the reader and of the cards to be read and providing an additional communication address.

The scheme proposed in this invention for resolving the above technical problem is to provide a method for card-reading anti-collision by using automatic frequency hopping, which is used for a system in which a card reader reads multiple cards simultaneously in RFID technologies. With this method:

Both the card reader and the cards to be read are configured to have an automatic frequency-sweep function and a function of hopping from a current channel to another channel, and to store access addresses and transaction addresses.

When the card reader is in frequency-hopping card-seeking state, it is in an n-channel frequency hopping working state. In this state, the access address of each channel is all the same, and the card reader reads the cards by means of hopping frequencies in a sequence iteratively through n channels. The method further includes the following steps:

A. When the card reader works at a certain channel, it first checks if any card responds. If yes, the card reader proceeds to Step B; if no, it proceeds to Step E;

B. The card reader checks whether two or more cards collide or conflict. If only one card is being read, the card reader proceeds to Step D;

C. The card reader gives a command of random frequency hopping, commanding all the conflicting cards to hop to other channels and wait to access those channels, and proceeds to Step E;

D. The card being read and the card reader read transaction addresses and carry out a transaction communication. After the transaction is completed, the card reader proceeds to Step E; and E. The card reader hops to a next channel in the sequence, and proceeds to Step A.

The access address is used to differentiate different systems, and the access address in a same system is the same.

The transaction address occurs at a stage after the card reader accesses the card to be read. It is used to differentiate different stages in a same system.

Comparing to existing technologies, this invention has the following beneficial effects: it can quickly realize a card-reading anti-collision mechanism and improve the card-reading speed.

DESCRIPTION OF THE EMBODIMENTS

This invention is further explained as follows in combination with the preferable embodiments shown in the attached figures.

Figure 1:
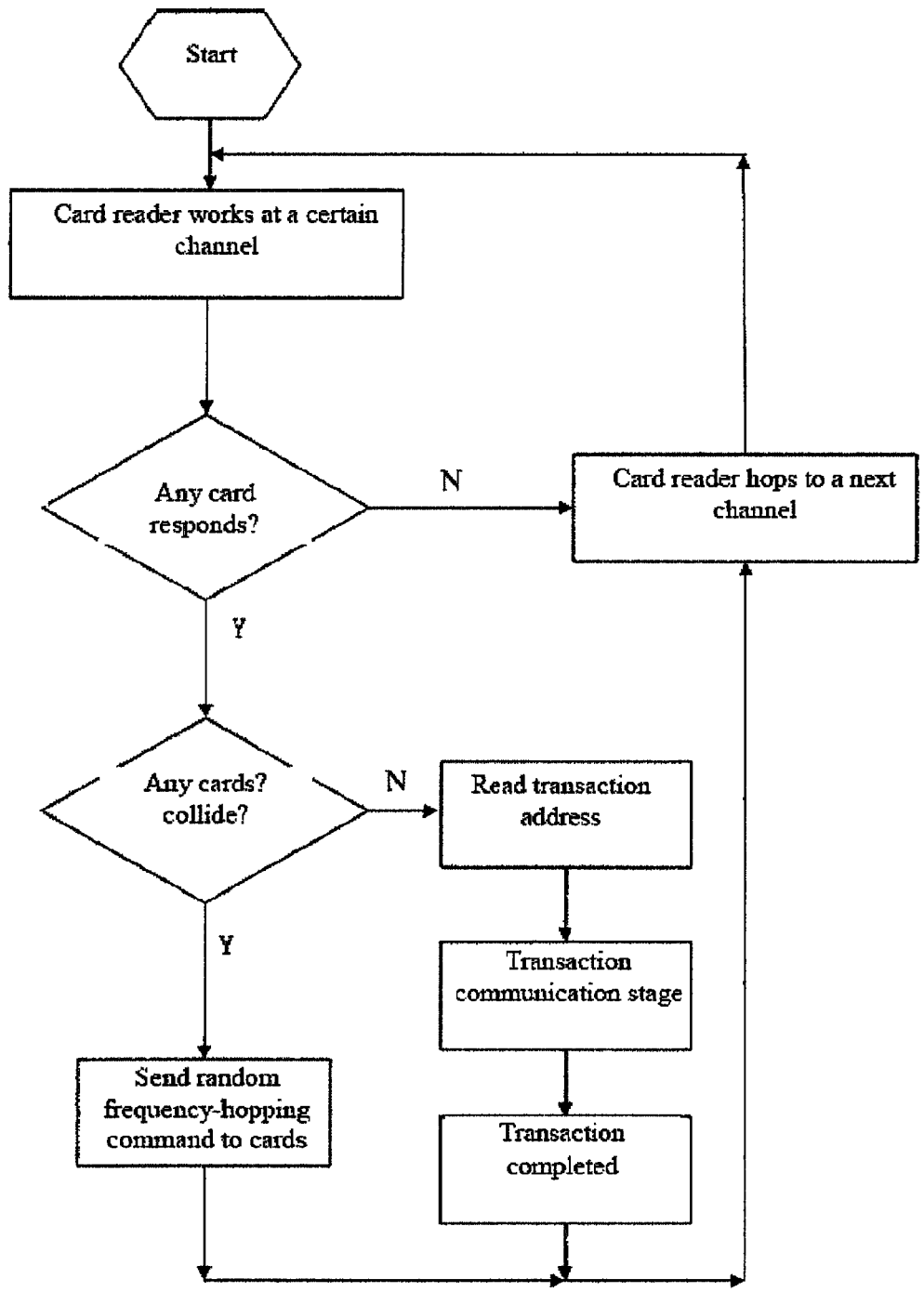
FIG. 1 is a flow chart illustrating a card reader's process of frequency-hopping anti-collision in accordance with the invention.
Figure 2:
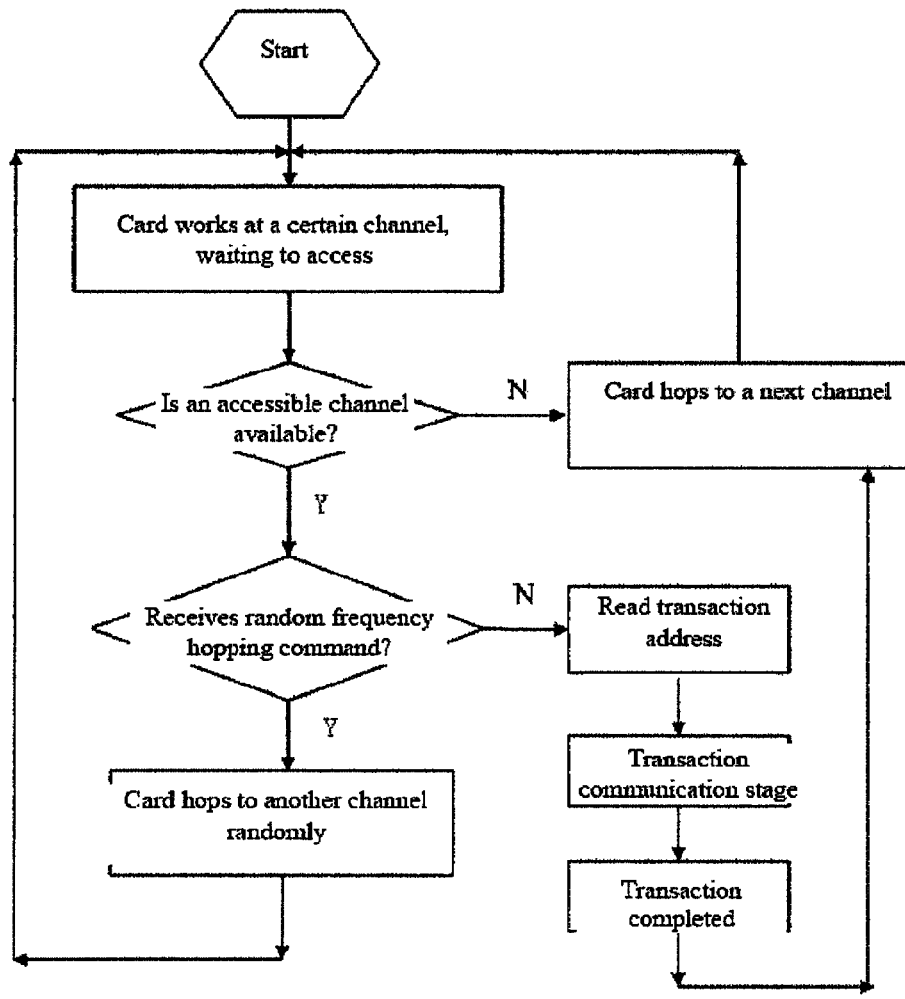
FIG. 2 is a flow chart illustrating a card's process of frequency-hopping anti-collision in accordance with the invention.

Referring to FIG. 1, a method for card-reading anti-collision by using automatic frequency hopping in accordance with this invention is implemented as follows:

A system having one card reader reading multiple cards simultaneously in RFID technologies, in which:

Both the card reader and the cards to be read are configured to have an automatic frequency-sweep function and a function of hopping from a current channel to another channel, and to store access addresses and transaction addresses.

When the card reader is in frequency-hopping card-seeking state, it is in an n-channel frequency hopping working state. In this state, the access address of each channel is the same, and the card reader reads the cards by means of hopping frequencies in a sequence iteratively through n channels. The process also includes the following steps:

A. When the card reader works at a certain channel, it first checks if any card responds. If yes, the card reader proceeds to Step B; if no, it proceeds to Step E;

B. The card reader checks whether two or more cards collide or conflict. If only one card is being read, the card reader proceeds to Step D;

C. The card reader gives a command of random frequency hopping, commanding all the conflicting cards to hop to other channels and wait to access those channels, and proceeds to Step E;

D. The card being read and the card reader read transaction addresses and carry out a transaction communication. After the transaction is completed, the card reader proceeds to Step E; and E. The card reader hops to a next channel in the sequence, and proceeds to Step A.

The access address is used to differentiate different systems, and the access address in a same system is the same.

The transaction address occurs at a stage after the card reader accesses the card to be read. It is used to differentiate different stages in a same system.

Supposing that the count of frequency bands for card reading to complete is 8, the working time for a card to remain in a channel equals to the working time for a card reader to scan 8 channels. The communication stage of each card is divided into an access stage and a transaction stage. When the card reader and the card are at the transaction stage, they will occupy this channel completely without being interfered by other cards. The numbers on the cards in attached FIGS. 3, 4, and 5 indicate the code numbers of the channels where the cards are working.

Figure 3:
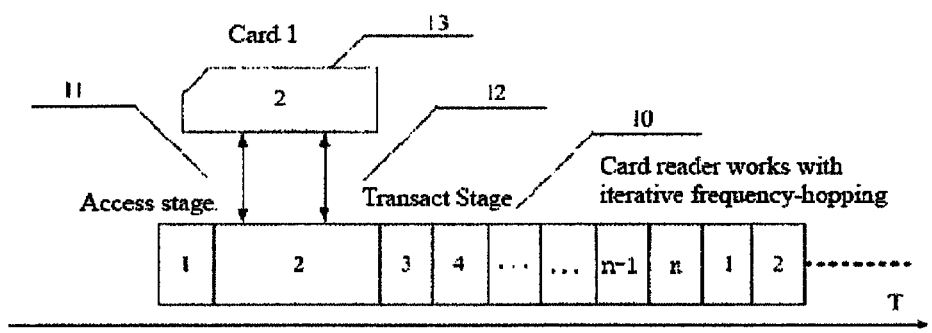
FIG. 3 is a schematic diagram in case of no conflict conditions.

Referring to FIG. 3, at a same moment, a card reader has only one card entering its induction zone. Supposing that Card 1 enters the induction zone of the card reader at Channel 2, when the card reader iterates to Channel 2, the card reader and Card 1 enter the access stage and the transaction stage with no collision.

Figure 4:
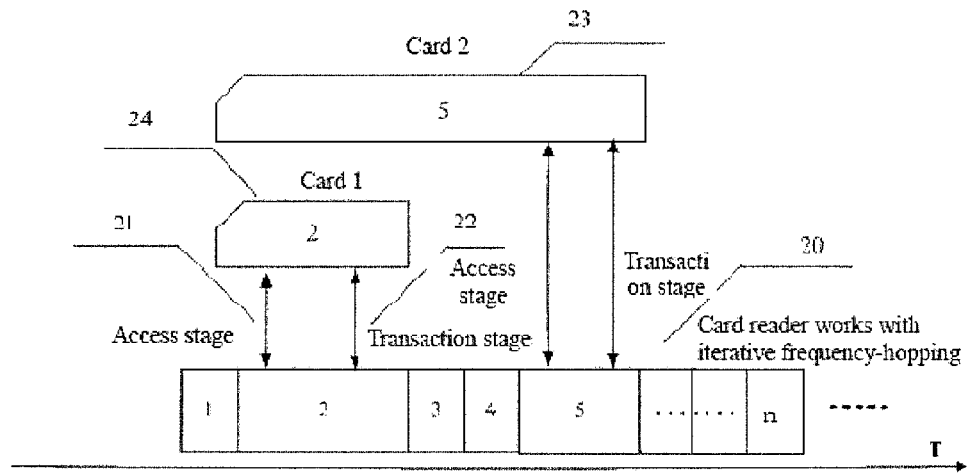
FIG. 4 is a schematic diagram where two cards are in an induction zone but no channel conflict condition exists.

Referring to FIG. 4, at a same moment, a card reader has two cards entering its induction zone. Supposing that Card 1 enters the induction zone of the card reader at Channel 2 and Card 2 enters the induction zone at Channel 5, these two cards collide physically, but logically these two cards are working in different channels. Therefore, at this moment the card reader can communicate with either of the two cards. When the card reader firstly iterates to Channel 2, it communicates with Card 1; afterwards, when the card reader iterates to Channel 5, it communicates with Card 2. Similarly, the card reader can also iterate to Channel 5 to communicate with Card 2 first, and then iterate to Channel 2 to communicate with Card 1. At this moment the two cards will not have a channel collision. The fact that no channel collision occurs is the very effect of the introduction of the anti-collision mechanism with automatic frequency hopping.

Figure 5:
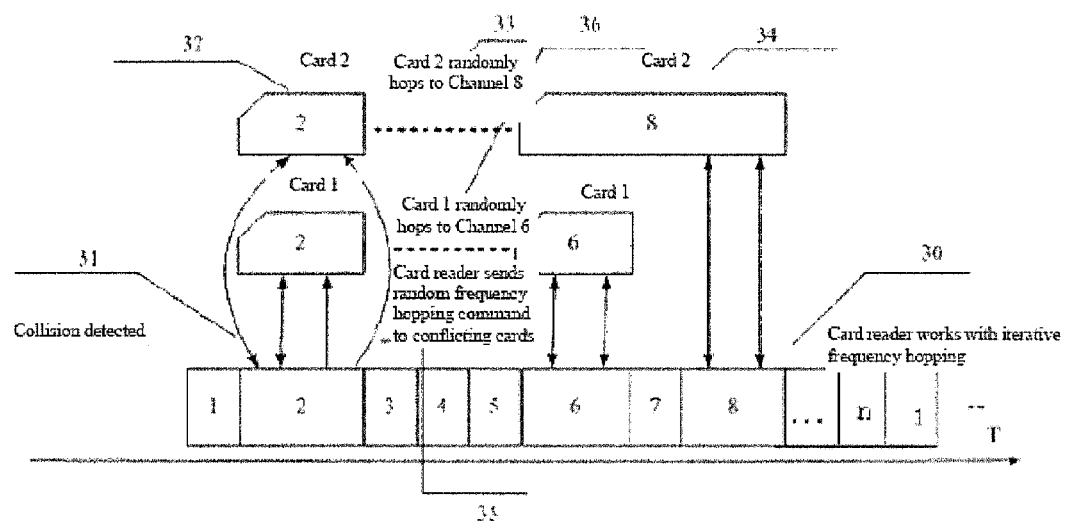
FIG. 5 is a schematic diagram of this invention when dealing with a channel conflict condition.

Referring to FIG. 5, at a same moment, a card reader has two cards entering its induction zone. Supposing that both Card 1 and Card 2 enter the induction zone of the card reader at Channel 2, they collide both physically and logically. Therefore, when the card reader iterates to Channel 2, Cards 1 & 2 both respond and the card reader detects the collision in Channel 2. Then the card reader will give a command of random frequency hopping to both conflicting cards. Supposing that Card 1 hops to Channel 6 and Card 2 hops to Channel 8 after receiving the command from the card reader, the two cards are in completely different channels, and the condition now is as same as that shown in FIG. 4. Supposing that Card 1 and Card 2 hop randomly to a same channel after receiving the command from the card reader, the card reader will detect the collision at this channel and will again give a command of random frequency hopping to the conflicting cards until all the cards work completely at different channels in signal paths. In this way, the anti-collision communication mechanism is accomplished.

The above are preferable embodiments of this invention. Any general modifications and replacements made by those skilled in the art based on this invention are within the scope of this invention.

What is claimed is:

1. A card-reading anti-collision method with automatic frequency hopping for a radio frequency identification system that includes a card reader reading multiple cards, the method comprising:
   (A) when the card reader works at one of n channels, checking via the card reader if any card responds; if yes, proceeding to Step (B); if no, proceeding to Step (E);
   (B) checking via the card reader whether two or more cards enter an induction zone of the card reader at the same one of n channels to collide or conflict; if yes, proceeding to Step (C); if only one card is being read, proceeding to Step (D);
   (C) issuing via the card reader a command of random frequency hopping, commanding all the conflicting cards to hop to other channels of the n channels and wait to access those channels, and proceeding to Step (E);
   (D) reading transaction addresses and carrying out a transaction communication at the card reader and the only card being read; after the transaction is completed, proceeding to Step (E); and
   (E) hopping at the card reader to a next channel of the n channels in a sequence, and proceeding to Step (A);
   wherein the card reader and the multiple cards have capabilities of automatic frequency-sweeping and/or of hopping from a current channel to another channel, and have capabilities of storing access addresses and transaction addresses, and
   when the card reader is in a frequency-hopping card-seeking state, the card reader is in an n-channel frequency hopping working state, in which the access address of each channel is the same, and the card reader reads the multiple cards by means of hopping frequencies in a sequence iteratively through the n channels.

2. The card-reading anti-collision method of claim 1, wherein: the access address is used to differentiate different systems, and the access address in a same system is the same.

3. The card-reading anti-collision method of claim 1, wherein the transaction address occurs at a stage after the card reader accesses the card to be read to differentiate different stages in a same system.

4. A radio frequency identification system for card-reading anti-collision with automatic frequency hopping, the system comprising:
   a card reader configured to read multiple cards;
   wherein the card reader and the multiple cards have capabilities of automatic frequency-sweeping and/or of hopping from a current channel to another channel, and have capabilities of storing access addresses and transaction addresses;
   wherein when the card reader is in a frequency-hopping card-seeking state, it is in an n-channel frequency hopping working state, in which the access address of each channel is the same, and the card reader reads the multiple cards by means of hopping frequencies in a sequence iteratively through n channels; and wherein:
- (A) when the card reader works at one of the n channels, the card reader first checks if any card responds; if yes, the card reader proceeds to Step (B); if no, the card reader proceeds to Step (E);
- (B) the card reader checks whether two or more cards enter an induction zone of the card reader at the same one of n channels to collide or conflict; if yes, the card reader proceeds to Step (C); if only one card is being read, the card reader proceeds to Step (D);
- (C) the card reader issues a command of random frequency hopping, commanding all the conflicting cards to hop to other channels of the n channels and wait to access those channels, and proceeds to Step (E);
- (D) the only card being read and the card reader read transaction addresses and carry out a transaction communication; after the transaction is completed, the card reader proceeds to Step (E); and
- (E) the card reader hops to a next channel of the n channels in the sequence, and proceeds to Step (A).

5. The radio frequency identification system of claim 4, wherein: the access address is used to differentiate different systems, and the access address in a same system is the same.

6. The radio frequency identification system of claim 4, wherein the transaction address occurs at a stage after the card reader accesses the card to be read to differentiate different stages in a same system.

* * * * *